United States Patent

[11] 3,588,360

[72] Inventor Keith Anthony Thomas Knox
London, England
[21] Appl. No. 796,026
[22] Filed Feb. 3, 1969
[45] Patented June 28, 1971
[73] Assignee Her Majesty's Postmaster General
London, England

[54] TELECOMMUNICATION SYSTEMS
8 Claims, 5 Drawing Figs.

[52] U.S. Cl. 179/1, 179/81
[51] Int. Cl. H04m 1/60
[50] Field of Search 179/81 (A), 81 (B), 1 (Vol.), 1.8

[56] References Cited
UNITED STATES PATENTS

| | | | |
|---|---|---|---|
| 3,409,738 | 11/1968 | Heald et al. | 179/1(.8) |
| 3,437,758 | 4/1969 | Clement | 179/81BX |
| 3,448,217 | 6/1969 | Leman et al. | 179/81B |
| 3,497,622 | 2/1970 | Markin et al. | 179/1 VOL |

*Primary Examiner*—Kathleen H. Claffy
*Assistant Examiner*—William A. Helvestine
*Attorney*—Hall and Houghton

ABSTRACT: The effect of high level background noise on a loud-speaking telephone set is minimized by providing a microphone positioned to pick up the background noise and an output which is used to control the gain of a receive amplifier and the threshold level of a voice-operated send speech gate in the telephone set.

KEITH A. T. KNOX,
INVENTOR
BY Hall & Houghton
ATTORNEY

Keith A. T. Knox,

INVENTOR

BY

ATTORNEY

KEITH A.T. KNOX
INVENTOR
BY [signature]
ATTORNEY

Keith A. J. Knox
INVENTOR
BY Hall & Houghton
ATTORNEY

TELECOMMUNICATION SYSTEMS

BACKGROUND OF THE INVENTION

This invention relates to substation circuits for voice-frequency transmission systems and particularly to telephone instruments for use in a noisy environment.

There is obvious difficulty in using a conventional telephone set when there is a high level of background acoustic noise e.g. due to traffic or machinery. Provision of an acoustically insulated booth is not always possible on grounds of cost or space. It is accordingly an object of this invention to provide a substation circuit which is suitable for use in such situations.

SUMMARY OF THE INVENTION

According to the present invention, a substation circuit for a telephone system comprises in combination a first microphone responsive to a user's speech, a voice-operated send speech gate connected to the first microphone, a second microphone positioned to pick up ambient background noise in the vicinity of the first microphone, a receive amplifier, a receiver, means for varying the gain of the amplifier in dependence upon the output of the second microphone, and a receive speech gate connected between the receive amplifier and the receiver, the receive speech gate being rendered non-conducting when the send speech gate is operated in response to an output of the first microphone.

According to a further subsidiary aspect of the invention the output of the second microphone is adapted to control the operate threshold of the voice-operated send speech gate.

The output of either the first or second microphone or both is passed through filters adapted to improve the discrimination between ambient noise and the user's speech. Alternatively or additionally, the discrimination is obtained by choosing microphones having suitable frequency characteristics. The frequency characteristics of the filters and/or the microphones are chosen according to the characteristics of the ambient noise.

DESCRIPTION OF THE PREFERRED EMBODIMENT

Figure 1:
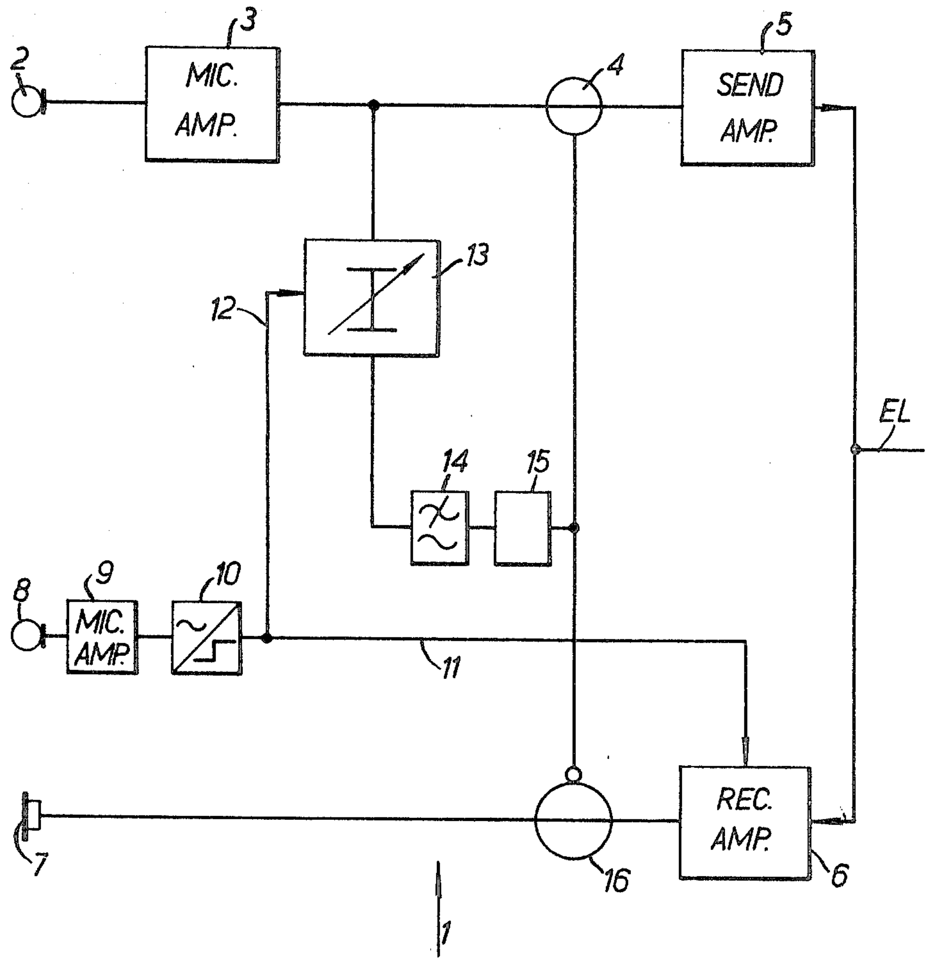
FIG. 1 is a block diagram of a substation circuit according to the invention, and, FIGS. 2A, 2B, 2C, when arranged as shown in FIG. 2 show a circuit diagram of such a circuit.

Referring to FIG. 1, a subscriber's or coin-operated substation circuit 1 is connected to an exchange by line EL. In FIG. 1 the usual block diagram convention of representing two leads by a single line has been adopted. The user's speech is picked up by microphone 2, which is desirably a linear dynamic microphone, and amplified by an amplifier 3. The amplified speech signal is fed via a send speech gate 4 and a send amplifier 5 to line EL.

Incoming speech signals from EL are fed via a receive amplifier 6 and a receive speech gate 16 to a receiver 7. The receiver 7 and the microphone 2 may be located in a conventional telephone handset.

A second linear dynamic microphone 8 is positioned so as to be shielded from the direct speech waves of the user but to be exposed to ambient acoustic noise and the output of this microphone is amplified by an amplifier 9 and fed to an AC/DC converter 10. The converter 10 delivers a DC output on leads 11 and 12 representative of the level of ambient noise picked by microphone 8. The DC signal on lead 11 controls the gain of the receive amplifier 6 so that the incoming signals are amplified in dependence upon the level of ambient noise.

The output from the amplifier 3 is also fed via a controlled attenuator 13 and a filter 14 to a speech detector 15 which may be an AC/DC converter. The output from the speech detector 15 opens the speech gate 4 and closes the speech gate 16. For use in a background of factory or traffic noise the filter 14 is desirably a low-pass filter having an upper frequency cutoff of about 1.6 kHz. This choice is found to improve the discrimination between user speech and ambient noise.

The output on lead 12 from the AC/DC converter 10 controls the attenuation of the speech signal input to the filter 14 and the speech detector 15, increasing attenuation as noise level rises, so that in effect the threshold of the voice-switch (comprising detector 15 and gates 4 and 16) is raised when the ambient noise level rises. It is necessary to raise the threshold to prevent the telephone being switched to sound by ambient noise incident upon microphone 2. The user will automatically, and perhaps subconsciously, speak more loudly in the presence of the ambient noise and will not be placed at a disadvantage by the raised threshold.

The frequency response of the send channel may be chosen suitably to improve speech-noise discrimination. In the particular embodiment this was accomplished by using a microphone of degraded bass response relative to the conventional frequency response of a telephone channel.

Figure 2:
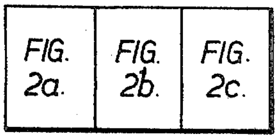
Figure 2A:
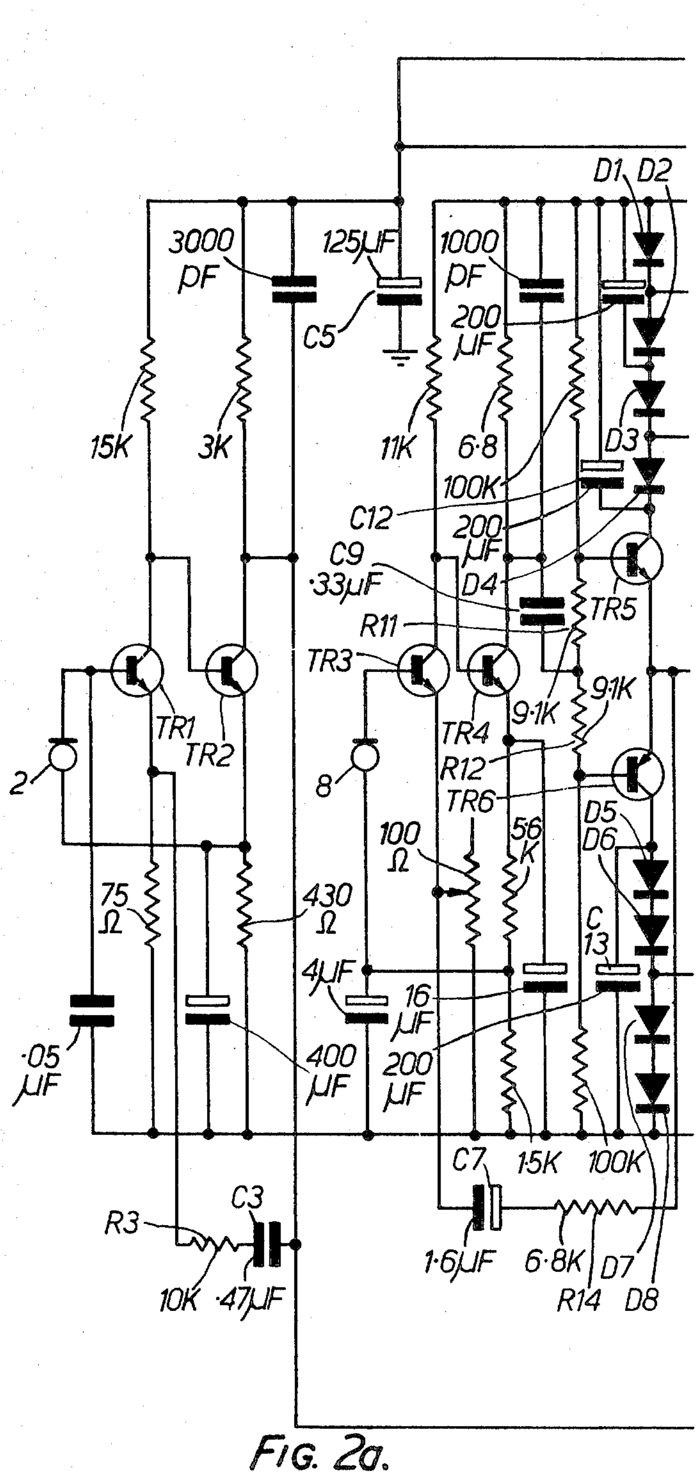
Figure 2B:
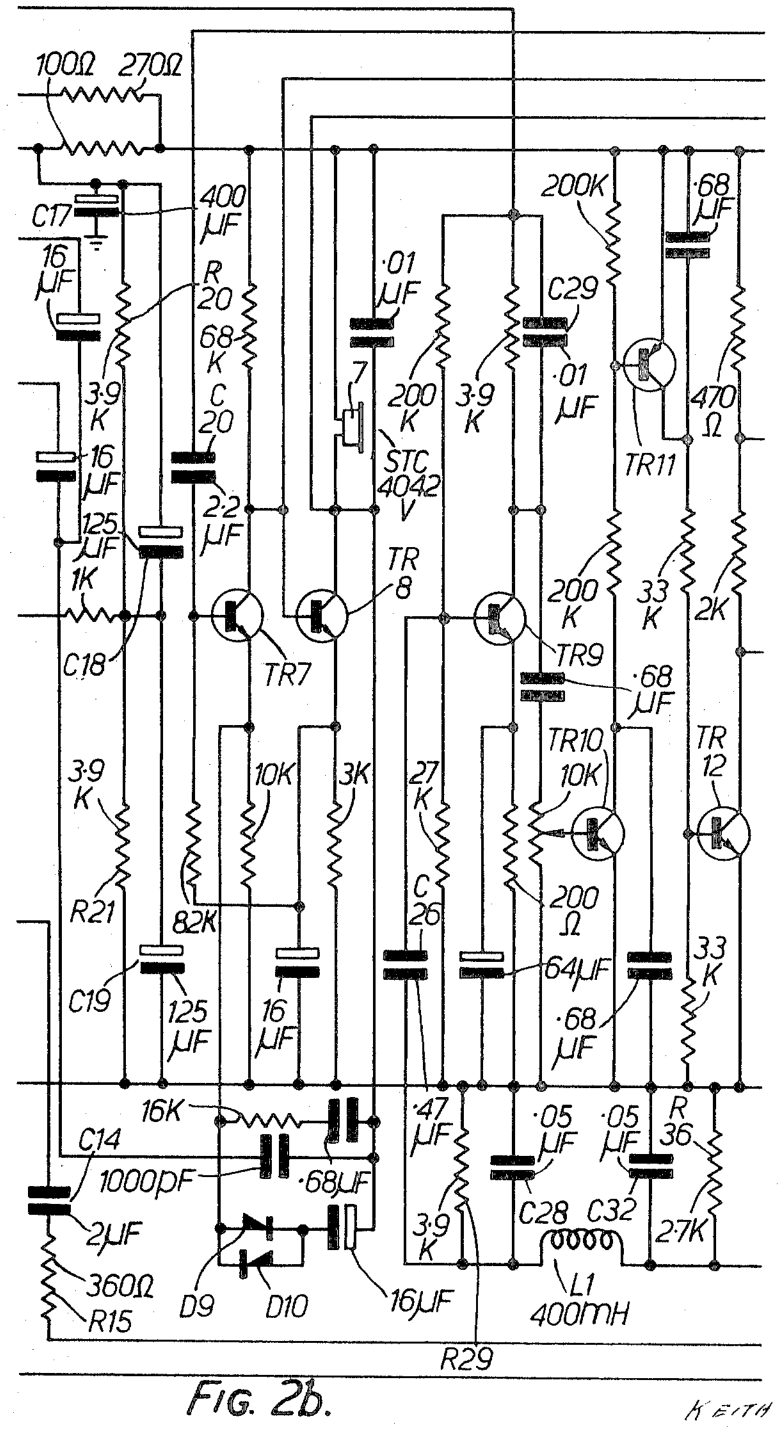
Figure 2C:
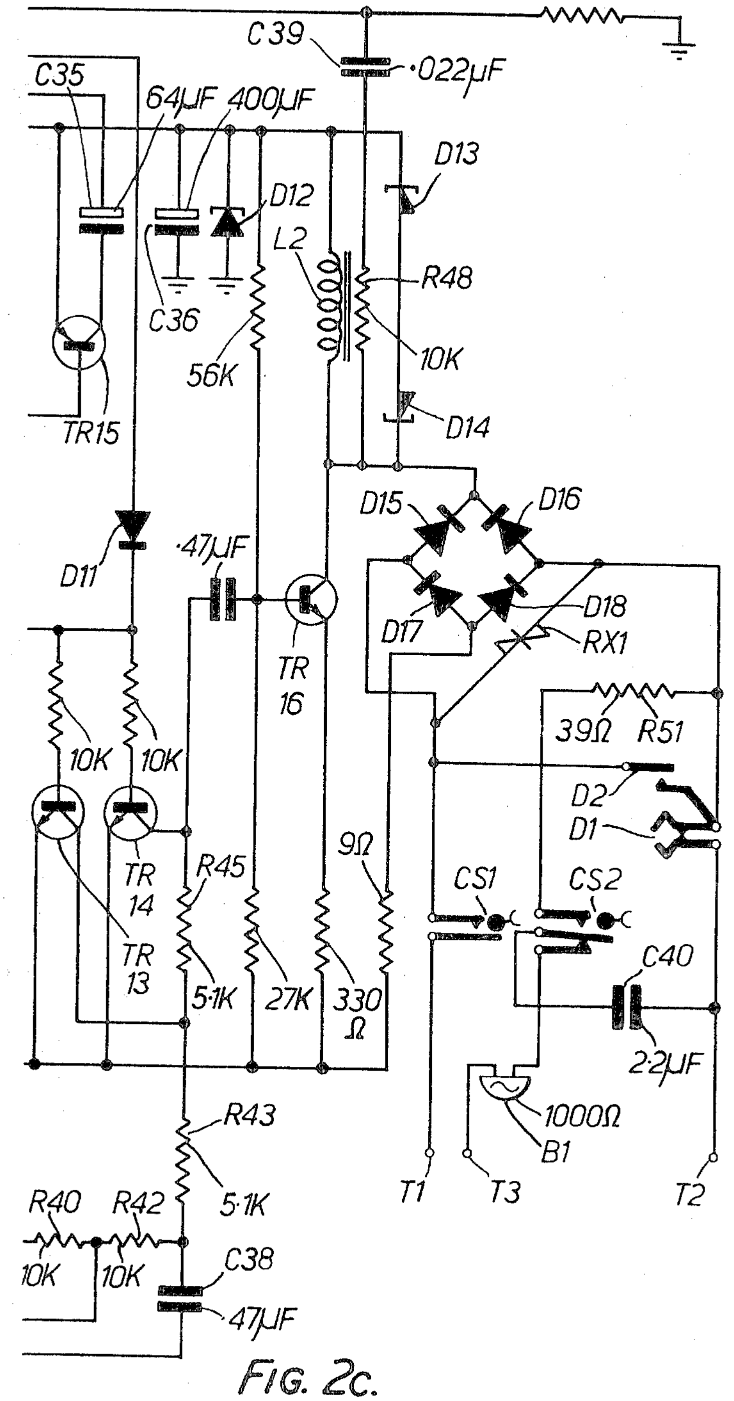

FIGS. 2A, 2B and 2C show, when assembled according to FIG. 2, a circuit diagram of the substation circuit, the earths shown being internal common connections only. FIG. 2C shows terminals T1 and T2 which are the line terminals of the substation circuit and are connected via a conventional balanced pair exchange line (not shown) to a telephone exchange. Terminal T3 is strapped to terminal T1 when an extension bell is not required.

The circuit also includes the conventional cradle switch contacts CS1 and CS2 and dial contacts D1 and D2. A capacitor C40 forms part of the ringing circuit for the subscriber's bell B1. The cradle switch is normal and together with resistor R51 forms a spark quench circuit for the dial pulsing contacts D1 when the cradle switch is off normal (handset lifted). Dial contacts D2 prevent dialling clicks being passed to the subscriber's telephone receiver 7.

The substation circuit comprises 16 transistors TR1—TR16 which are supplied with power over the exchange line via a rectifier bridge comprising diodes D15—D18. A voltage-dependent resistor RX1 protects the rectifier bridge against over-voltage (as on ringing) and the output voltage of the bridge is stabilized at approximately 9 volts by a Zener diode D12 and decoupled by capacitors C5, C17 and C36. A mid-point potential is provided by resistors R20 and R21 decoupled by capacitors C18 and C19.

The output of the linear dynamic speech microphone 2 is fed to transistors TR1, TR2 which together comprise amplifier 3 (FIG. 1). The transistors TR1 and TR2 are in common-emitter configuration with negative feedback from the collector of TR2 via capacitor C3 and resistor R3 to the emitter of TR1.

The output signal at the collector of TR2 is fed via capacitor C38 and resistor R43 to transistors TR13 and TR14 acting as shunt elements and which together form the linear speech gate 4 of FIG. 1. That output is also fed to a resistor network, R40 and R42 and thence via resistor R15 and capacitor C14 to diode assembly D5, D6, D7 and D8. The controlled attenuator 13 of FIG. 1 comprises resistor R40 and R42 as series elements and resistor R15 and capacitor C14 in series with the parallel combination of forward biassed selenium diodes D5, D6 and D7, D8 as shunt elements. The dynamic impedance of the diodes D5...D8 and hence the loss introduced by the attenuator is controlled by the collector current of transistor TR6.

Capacitors C28 and C32 with resistors R29 and R36, inductor L1 form the low-pass filter 14 of FIG. 1 whose output is connected via capacitor C26 to the base of transistor TR9 connected in common emitter configuration and functioning as a linear audio amplifier to form the first stage of the speech detector 15 of FIG. 1. Capacitor C29 in the collector circuit of TR9 reduces the high frequency response of the amplifier and thereby assists the action of the low-pass filter whose cutoff occurs at about 1.6 kHz.

The output of the linear dynamic microphone 8 is fed to transistors TR3 and TR4 in common emitter configuration and together comprising the amplifier 9 of FIG. 1. The output from the collector of transistor TR4 is fed via a capacitor C9 to the bases of transistors TR5 and TR6 via resistors R11 and R12 respectively. Transistors TR5 and TR6 together with selenium diodes D1...D8 and capacitors C12 and C13 form the AC/DC converter 10 of FIG. 1. In operation, unidirectional current pulses at the collectors of transistors TR5 and TR6 charge capacitors C12 and C13 respectively. The DC potentials developed across the capacitors C12 and C13 drive current through the selenium diode combinations D1...D4 and D5...D8 respectively. Negative feedback from the emitters of transistors TR5 and TR6 to the emitter of transistor TR3 via resistor R14 and capacitor C7 is used to provide the desired relationship between noise level at the microphone 8 and the dynamic impedance of the diode networks D1...D4 and D5...D8.

Transistors TR10 and TR11 complete the speech detector 15. When there is no input to the base of transistor TR9, transistors TR10, TR11 and TR12 are nonconducting with the result that transistor TR15 is also nonconducting although transistors TR13 and TR14 are conducting. As has been explained above transistors TR13 and TR14 together constitute the speech gate 4 of FIG. 1, whilst transistors TR12 and TR15 make up the speech gate 16 of FIG. 1. As a result, signals from transistors TR1 and TR2 are heavily attenuated in resistors R43 and R45 and do not pass to the exchange line.

On the other hand, signals coming from line via resistor R48 and capacitors C39 and C20 are fed to transistors TR7 and TR8 constituting amplifier 6 of FIG. 1 and are reproduced in the receiver 7. The amplifier 6 has a negative feedback path from the collector of transistor TR8 to the emitter of transistor TR7 via a network which includes components C23, R25 and C21. This feedback path is shunted to earth for speech signals by the dynamic impedance of a network composed of the diodes D1...D4 and capacitors C11, C12, C15 and C16. The dynamic impedance of the network and in particular of the diodes D1...D4 is controlled by the collector current of transistor TR5 and hence by the signal level at microphone 8. Increasing input to microphone 8 decreases the dynamic impedance of the diodes and hence reduces the amount of negative feedback in the amplifier thus increasing its gain. The feedback path also includes diodes D9 and D10 which have the effect of increasing the amount of negative feedback for high level signals and thus have a clipping effect on high level signals.

When the signal applied to the base of transistor TR10 exceeds the threshold referred to above, transistors TR10, TR11 and TR12 rapidly saturate, transistors TR13 and TR14 are thereby rendered nonconducting and transistor TR15 is caused to saturate. Signals from microphone 2 can now pass to the exchange line. Incoming signals are, however, not reproduced at the receiver 7 due to the low impedance of shunt circuits comprising capacitor C35 and transistor TR15 on the one hand, and diode D11 and transistor TR12 on the other hand.

The microphone 2 has a response which is deficient at the lower bass end of its frequency range and this reduces the disturbing effects of switched background noise at the far end of a connection. Otherwise, the signals are passed to the exchange line at normal level.

To preserve stability it is necessary to ensure that the gates 4 and 16 are not open simultaneously and to ensure that there is a guard interval to prevent signals from receiver 7 reaching the microphone 2.

Transistor TR16 is the line drive amplifier 5 of FIG. 1 and has its collector load shown as inductor L2, shunted by the line. Inductor L2 blocks incoming signals (so preventing them from reaching the potential supply) and helps so far as outgoing signals are concerned to swamp the effect of wide changes in line impedance.

Zener diodes D13, D14 protect against overvoltage (for example on ringing).

I claim:

1. A substation circuit for a telephone system comprising in combination a first microphone operable to pick up a user's speech, a voice-operated, send speech gate connected to the first microphone, a second microphone positioned to pick up ambient background noise in the vicinity of the first microphone, a receive amplifier, a receiver, means for varying the gain of the receive amplifier in dependence upon the output of the second microphone, and, a receive speech gate connected between the receive amplifier and the receiver, the receive speech gate being rendered nonconducting when the send speech gate is operated to transmit speech in response to an output from the first microphone.

2. A substation circuit for a telephone substation as claimed in claim 1 in which the voice-operated send speech gate has a variable threshold, the substation also comprising further means responsive to the output of the second microphone for varying the threshold in dependence upon the level of background noise.

3. A substation circuit as claimed in claim 2 in which the further means comprises a further amplifier connected to receive the output of the second microphone, an AC/DC converter connected to receive the output of the further amplifier, a controlled attenuator whose attenuation is determined by the output of the converter, a speech detector, a connection from the first microphone to the controlled attenuator, and a further connection from the speech detector to the voice-operated send speech gate to control the threshold thereof.

4. A substation circuit as claimed in claim 3 and further comprising low-pass filter means interconnected between the controlled attenuator and the speech detector.

5. A substation circuit as claimed in claim 3 in which the output of the converter is applied to the receive amplifier to control the gain thereof.

6. A substation circuit as claimed in claim 1 in which the first microphone has a degraded bass response relatively to a conventional frequency response.

7. A substation circuit as claimed in claim 1 in which the receive amplifier includes a clipping circuit for clipping the levels of high amplitude signals prior to such signals reaching the receiver.

8. A substation circuit as claimed in claim 7 in which the clipping circuit comprises diodes in opposed parallel connection.